United States Patent
Jung et al.

[19]

[11] Patent Number: 6,130,525
[45] Date of Patent: Oct. 10, 2000

[54] HYBRID REGULATOR

[75] Inventors: Nam-Sung Jung, Wonjoo; Gyu-Hyeong Cho, Taejon, both of Rep. of Korea

[73] Assignee: Korea Advanced Institute of Science and Technology, Rep. of Korea

[21] Appl. No.: 09/242,489
[22] PCT Filed: Feb. 16, 1998
[86] PCT No.: PCT/KR98/00031
§ 371 Date: Feb. 17, 1999
§ 102(e) Date: Feb. 17, 1999
[87] PCT Pub. No.: WO99/03028
PCT Pub. Date: Jan. 21, 1999

[30] Foreign Application Priority Data

Jul. 10, 1997 [KR] Rep. of Korea ............... 97-32006

[51] Int. Cl.⁷ ............................................. G05F 1/40
[52] U.S. Cl. ...................... 323/268; 323/272; 323/277
[58] Field of Search ............................. 323/266, 268, 323/271, 272, 273, 277, 279, 280, 282, 290

[56] References Cited

U.S. PATENT DOCUMENTS

| | | | |
|---|---|---|---|
| 4,881,023 | 11/1989 | Perusse et al. | 323/266 |
| 5,216,351 | 6/1993 | Shimoda | 323/268 X |
| 5,592,072 | 1/1997 | Brown | 323/268 |
| 5,864,225 | 1/1999 | Bryson | 323/268 |

*Primary Examiner*—Jessica Han
*Attorney, Agent, or Firm*—Bachman & LaPointe, P.C.

[57] ABSTRACT

A hybrid regulator in which a switching regulator and a series regulator are inter-connected in a desired manner. In the hybrid regulator, most of current required for a load is supplied from the switching regulator which has a poor regulation performance while having high efficiency. The hybrid regulator also includes a sensing unit for the rapid sensing of the current supplied to the load. Based on the operation of the sensing unit, the series regulator, which has a poor power efficiency while exhibiting a excellent regulation performance, supplies or absorbs only a small amount of ripple current. The series regulator serves as an independent voltage source whereas the switching regulator serves as a dependent current source. Accordingly, the hybrid regulator ensures a superior regulation performance while achieving high efficiency.

8 Claims, 5 Drawing Sheets

HYBRID REGULATOR

BACKGROUND OF THE INVENTION

1. Field of the Invention

The present invention relates to a regulator in which a switching regulator and a series regulator are interconnected, and more particularly to a "hybrid" regulator configured to utilize the advantage of a series regulator, namely, a superior regulation performance having no ripple even when a variation in load occurs, and to utilize the advantage of a switching regulator, namely, high efficiency.

2. Description of the Prior Art

In accordance with the advent of Green Round, many efforts to reduce the absolute quantity of energy used have recently been made in a variety of technical fields. Such efforts have also been made in conjunction with electronic and electrical appliances. In addition to such efforts, another effort has been made to increase the efficiency of energy used, thereby minimizing a loss of energy.

Meanwhile, all electronic appliances, electrical appliances, electric home appliances and a variety of industrial electronic appliances, which are currently used, essentially require a stable power supply, namely, DC—DC converter. Most appliances, in which electronic circuits are included, use a stable DC power such as +5V DC, +12V DC or +15V DC in general.

For electronic devices such as IC's, transistors, lamps, etc., a maximum allowable voltage is set. When an electronic device is supplied with the voltage greater than its maximum allowable voltage, it may be damaged or reduced in use life. Where an operational amplifier or comparator is used to amplify signals having a low amplitude or to compare such signals, a variation in voltage occurring in an external power supply adapted to supply voltage to the circuit may cause the malfunction of the circuit, thereby resulting in a degradation in the accuracy or stability. In addition to developments of electronic devices having high accuracy, therefore, developments of stable power supply devices are also important.

Generally, a regulator is a device for maintaining output voltage or current in a strong and uniform state irrespective of a variation in input or output load. Regulators currently used are mainly classified into switching regulators and series regulators. The series regulator is generally used when the good regulation performance without ripple is needed. On the other hand, the switching regulator is used to obtain high efficiency while reducing in size.

Referring to FIG. 1, an example of a series regulator is illustrated. The series regulator is also called a "linear regulator" or "dropper regulator". This regulator has an advantage of an excellent output-voltage regulation and a disadvantage of a poor power transformation efficiency. In this regard, the series regulator is suitable for the case in which a prominent regulation but low electric power is required. Since such a series regulator is controlled in a voltage series feedback scheme while having no delay element (for example, an inductor connected in series to the regulator, or a capacitor connected in parallel to the regulator) arranged on its main power supply path, it inherently has a superior regulation performance in steady state as well as transient state condition.

In the series regulator shown in FIG. 1, a "differential voltage" between an external supply voltage Vdd and an output voltage Vo observed in load resistor R4 is applied between the collector and emitter of an output transistor Q1. In this state, the same amount of current as that required for the load resistor R4 is supplied to the emitter of the output transistor Q1 via the collector of the output transistor Q1. For this reason, this series regulator exhibits a poor power efficiency.

In this case, the power used in the load resistor R4 is expressed by the following expression (1) whereas the power loss in the output transistor Q1 is expressed by the following expression (2):

$$P_{R4} = V_{R4} \times I_{R4} \qquad \text{[Expression 1]}$$

$$P_{Q1} = V_{CE} \times I_C \approx V_{CE} \times I_{R4} \qquad \text{[Expression 2]}$$

In order to reduce the power loss in the transistor Q1, expressed by Expression (2), it is required to decrease the voltage $V_{CE}$ applied between the collector and emitter of the output transistor Q1 or reduce the current IC flowing through the collector of the output transistor Q1, or to simultaneously decrease the voltage $V_{CE}$ and current $I_C$.

The current $I_{R4}$ flowing through the load resistor R4 is almost the same as the collector current $I_C$. The sum of the voltage $V_{R4}$ applied across the load resistor R4 and the collector-emitter voltage $V_{CE}$ is the same as the external supply voltage Vdd. Assuming that the loss of power in other elements of the series regulator is ignored, accordingly, the power efficiency of the series regulator is approximately expressed by the following expression (3):

$$\eta = \frac{P_{R4}}{P_{Total}} \approx \frac{P_{R4}}{P_{R4} + P_{Q1}} = \frac{V_{R4}}{Vdd}. \qquad \text{[Expression 3]}$$

In Expression (3), "η" represents a power efficiency, and "$P_{total}$" represents the totally consumed power of the said series regulator.

Where the series regulator is adopted to regulate the voltage of +5V for driving a TTL IC when an external supply voltage Vdd of +12V is used, +7V DC, which is a differential voltage between the external supply voltage and output voltage, is applied between the collector and emitter of the output transistor Q1. In this case, accordingly, the power efficiency of the series regulator corresponds to about 42%.

Of course, the power transformation efficiency may be enhanced by increasing the voltage $V_{R4}$ while decreasing the voltage Vdd, as apparent from Expression (3). However there is a limitation in optional setting of the power efficiency because the range, in which a desired external supply voltage or desired output voltage is selected, is limitative.

On the other hand, the loss of power consumed during the power transformation is completely changed into heat. Therefore, a large heat sink should be additionally used in order to prevent the output transistor Q1 from being heated to a temperature higher than an allowable temperature. This results in a bulky volume. For this reason, it is difficult to use the series regulator as a power supply in the case in which a high power of more than 20 W should be used.

Referring to FIG. 2, an example of a switching regulator is illustrated. As shown in FIG. 2, the switching regulator has a configuration similar to the series regulator, except that it uses a comparator U2 as its control element whereas the series regulator uses an operational amplifier U1 as its control element. The switching regulator also includes a regulation circuit, composed of inductor and capacitor, arranged between the output transistor Q1 and load resistor R4, different from the series regulator. In other words, the switching regulator carries out a switching control whereas the series regulator carries out a linear control. Accordingly, the switching regulator involves a switching ripple, even though there is no output ripple involved in the series regulator.

In the switching regulator of FIG. 2, output voltage applied across the resistor R4 is sensed by negative feedback resistors R2 and R3. For the output voltage, a comparison is then carried out in the comparator U2. Based on the result of the comparison, the comparator U2 outputs a signal of high or low level. In response to the output signal from the comparator U2, the output transistor Q1 performs an ON or OFF switching operation. As a result, voltage of a high level (namely, Vdd) or low level (namely, zero) is applied to an inductor L1. In a steady state, the pulse waveform of the voltage is regulated by the regulation circuit which includes a capacitor C1 along with the inductor L1. The output voltage across the capacitor C1 has a value corresponding to an average value of a pulse wave applied to inductor L1, so that it has a waveform involving a switching ripple.

A ripple involved in an output voltage of the switching regulator includes a switching ripple caused by a switching operation itself and a load variation ripple due to a variation in load. The switching ripple can be reduced by increasing the switching frequency. In this case, however, the loss of power caused by the switching operation increases with proportion to switching frequency. As a result, a degradation in the power efficiency inevitably occurs. For this reason, it is necessary to use elements having a high operating speed, too. However, this results in an increase in the manufacturing costs.

The load variation ripple can be reduced by using a regulation circuit having large inductance and capacitance, thereby improving the regulation performance. In this case, however, the inductor and capacitor used are bulky. An increase in the manufacturing costs also occurs.

As apparent from the above description, the switching regulator meets the purpose of Green Round in that it has the advantages of reduction of power loss, namely, high power efficiency, and a reduced size. However, this switching regulator has disadvantages in that a switching ripple is involved in its output voltage and its ability to cope with a variation in load is insufficient.

The following Table 1 shows the advantages and disadvantages of existing series regulators and switching regulators which are opposite to each other.

TABLE 1

| Advantages | Disadvantages |
| --- | --- |
| Series Regulator | |
| Excellent Regulation Performance | Poor Power Efficiency |
| Involving No Ripple | |
| Strong against Variation in Load | Bulky Heat Sink |
| Switching Regulator | |
| Good Power Efficiency | Bad Regulation Performance Involving Switching Ripple |
| Compact Heat Sink | Weak against Variation in Load |

SUMMARY OF THE INVENTION

Therefore, an object of the invention is to solve the above-mentioned problems involved in conventional series regulators and switching regulators and to provide a hybrid regulator configured to utilize the advantage of series regulators, namely, a superior regulation performance involving no ripple even when a variation in load occurs, and to utilize the advantage of switching regulators, namely, high efficiency.

In accordance with the present invention, this object is accomplished by providing a hybrid regulator comprising: a series regulator serving as an independent voltage source; and a switching regulator serving as a dependent current source, the switching regulator is coupled to the series regulator in such a manner that the series regulator supplies or absorbs a desired small amount of current to prevent a ripple from being generated when the switching regulator supplies a large amount of current at a high power efficiency.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 3:
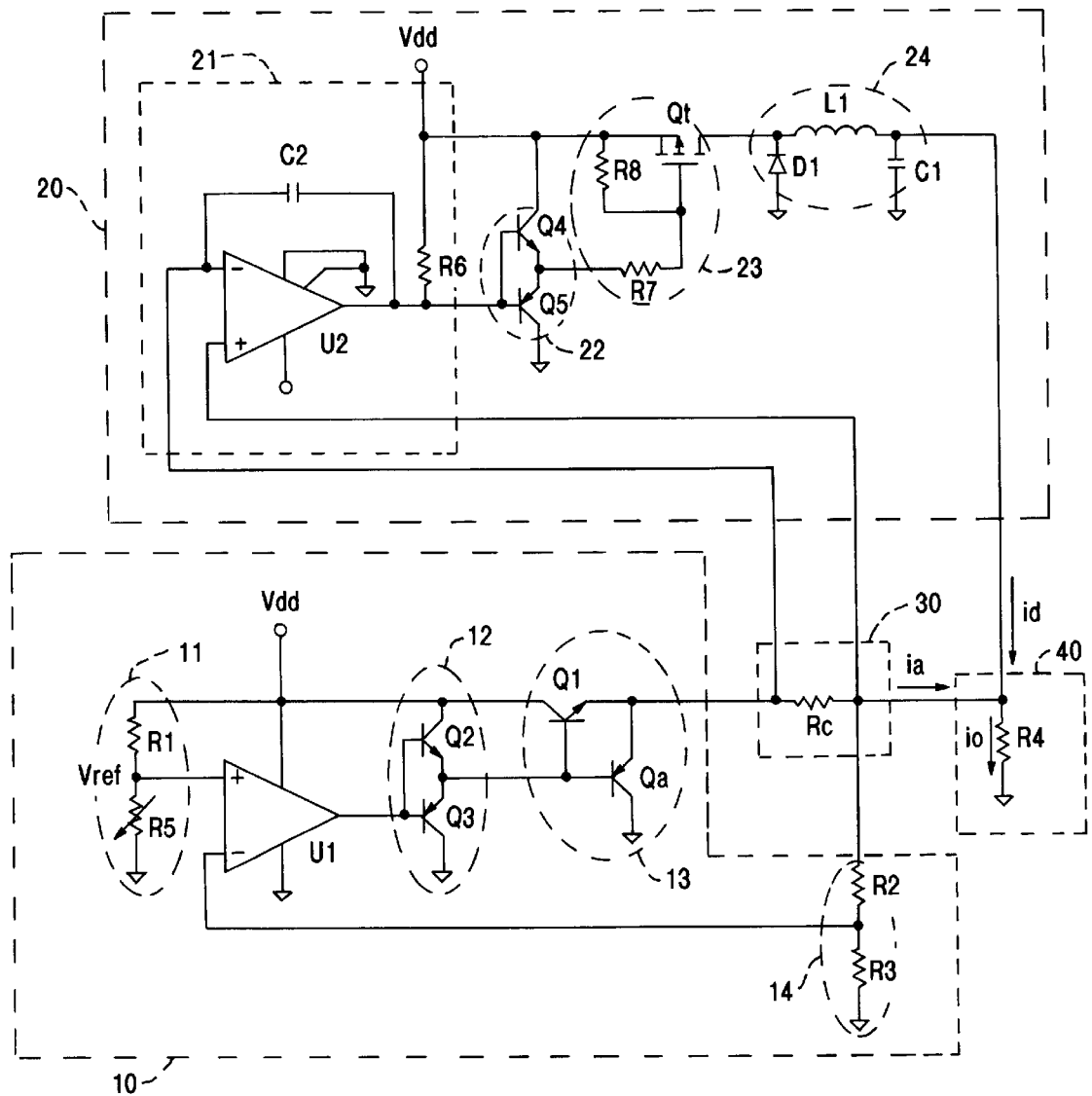
FIG. 3 is a circuit diagram illustrating a hybrid regulator according to the present invention.

Referring to FIG. 3, a hybrid regulator according to an embodiment of the present invention is illustrated. As shown in FIG. 3, the hybrid regulator mainly includes four functional blocks, namely, a series regulator 10 which is an independent voltage source, a switching regulator 20 which is a dependent current source, a sensing unit 30 for sensing a small amount of current ia output from the series regulator 10, thereby outputting a control voltage adapted to control the switching regulator 20 to supply a large amount of current $i_d$, and a load 40. In accordance with the present invention, the series regulator 10 includes a reference voltage generating circuit 11 for generating a reference voltage $V_{ref}$, that is, a voltage divided by resistors R1 and R5 connected in series between an external supply voltage source Vdd and the ground. The series regulator 10 also includes an operational amplifier U1 for receiving the output voltage from the reference voltage generating circuit 11 and a negative feedback voltage, a base driver 12 consisted of two transistors Q2 and Q3 and serving to receive an output voltage from the operating amplifier U1, an output stage circuit 13, and a negative feedback circuit 14. The output stage circuit 13 consists of a transistor Q1 for supplying an external voltage to the sensing unit 30, and a transistor $Q_a$ for conducting an output voltage from the sensing unit 30 to the ground. The negative feedback circuit 14 consists of two resistors R2 and R3 to determine the gain of the entire system.

In accordance with the present invention, the switching regulator 20 includes a comparing circuit 21 consisted of a comparator U2 for receiving a voltage applied across the sensing unit 30, a capacitor C2, and a pull-up resistor R6. The switching regulator 20 also includes a gate driver 22 consisted of two transistors Q4 and Q5 and serving to receive an output voltage from the comparing circuit 21, an output stage circuit 23 consisted of a MOSFET (metal oxide semiconductor field effect transistor) $Q_t$ and two resistors R7 and R8 and serving to receive an output voltage from the gate driver 22 as a control voltage, and a regulation circuit 24 consisted of an inductor L1, a capacitor C1 and a diode D1 and serving to regulate the current output from the output stage circuit 23.

In accordance with the present invention, the sensing unit 30 simply includes a sensing resistor $R_c$ coupled between the output stage circuit 13 of the series regulator 10 and the load 40 namely, a resistor R4. The sensing resistor $R_c$ senses the current $i_a$ supplied thereto or absorbed therein and converts the sensed current into a corresponding voltage.

Although the reference voltage generating circuit 11 of the series regulator 10 is configured to generate a reference voltage in accordance with a voltage distribution rule obtained by using resistors, the reference voltage may be generated using a Zener diode or other appropriate means.

Figure 1:
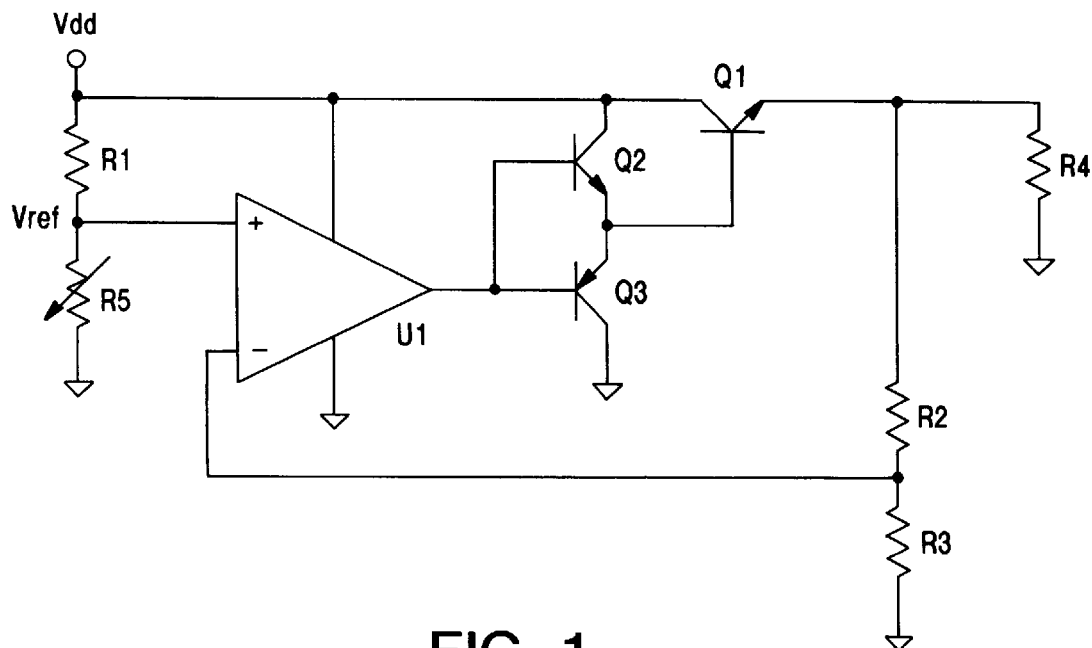
FIG. 1 is a circuit diagram illustrating a conventional series regulator.
Figure 2:
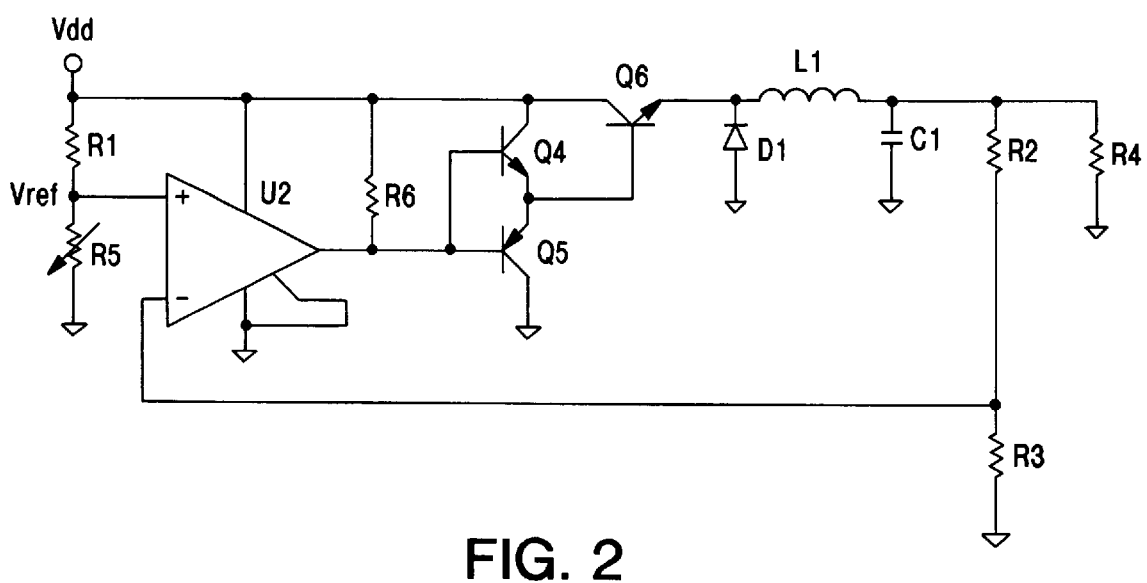
FIG. 2 is a circuit diagram illustrating a conventional switching regulator.

The series regulator 10, which is applied to the present invention, has a particular difference from conventional series regulators in that it has a transistor $Q_a$ adopted to absorb the current ia For example, in the conventional series regulator of FIG. 1, it has only one NPN transistor Q1 for its output stage circuit. However, in accordance with the present invention, the output stage circuit 13 of the series regulator 10 includes the PNP transistor $Q_a$ in addition to the NPN transistor Q1.

The reason why the PNP transistor $Q_a$ is additionally used is because the series regulator of the present invention should have a function for absorbing the current $i_a$, namely, $-i_a$, in addition to a function for supplying the current $i_a$ to the load 40. In the case of the conventional series regulator, only the function for supplying the current $i_a$ to a load is required.

The series regulator 10 of the present invention should have a bandwidth made as wide as possible, in order to rapidly supply or absorb a ripple current caused by the inductor L1 of the switching regulator 20. Although the series regulator 10 and switching regulator 20 are connected to the resistor R4 of the load 40 in a parallel manner, there is no problem because the series regulator 10 serves as a voltage source whereas the switching regulator 20 serves as a current source.

Now, a quantitative characteristics of the current ia flowing through the resistor R4 used as a load will be described in conjunction with FIG. 3.

Load current $i_o$ corresponds to the sum of the current $i_a$ supplied from the series regulator 10 and the current $i_d$ supplied from the switching regulator 20. This can be expressed by the following expression (4):

$$i_o = i_a + i_d.$$ [Expression 4]

Since the series regulator 10 has a considerably poor efficiency as compared to the switching regulator 20, it is necessary to reduce the current $i_a$ while increasing the current $i_d$, in order to ensure a high efficiency. In other words, the current $i_d$ should be sufficiently greater than the current $i_a$. That is, the following relationship should be established:

$$i_d = k i_a \text{ (provided, } k \gg 1\text{)}.$$ [Expression 5]

In Expression 5, the parameter k is the rate of $i_d$ to $i_a$, that is, a current gain. This parameter k can be adjusted by varying the sensing resistor $R_c$ constituting the sensing unit 30, the resistor R6 adopted to determine the rising and falling characteristics of the output of the comparator U2 of the comparing circuit 21, and the the capacitor C2 in the configuration of FIG. 3.

Empirically, the parameter k has a value ranging from single digits to several tens. Where the parameter k has a large value of several tens, an approximate expression can be derived from Equations (4) and (5), as expressed by the following equation (6):

$$i_o = i_a + i_d = i_a + k i_a \approx k i_a = i_d.$$ [Expression 6]

In a steady state, high efficiency is obtained because most of the current $i_o$ required for the load 40 is supplied by the current $i_d$ supplied from the switching regulator 20. Only when a variation in the load occurs in the transient state, the series regulator 10 rapidly supplies the current $i_a$ in the form of a ripple current. Accordingly, the hybrid regulator of the present invention exhibits a superior regulation performance. Such a physical expression is implied in Expression (6).

The operation of the hybrid regulator according to the present invention will now be described in terms of qualitative concepts.

When a supply voltage Vdd is externally supplied to the hybrid regulator, a reference voltage $V_{ref}$ is generated from the reference voltage generating circuit 11. The reference voltage $V_{ref}$ is applied to a non-inverting input terminal (+) of the operational amplifier U1. The operational amplifier U1 also receives voltage at its inverting data input terminal (−). In the initial condition, the voltage applied to the inverting input terminal (−) of the operational amplifier U1 is zero because the load 40 outputs voltage of a zero level, and this zero-level voltage is applied to the inverting input terminal (−) via the negative feedback circuit 14.

As a result, the operational amplifier U1 generates an output voltage having a level higher than the zero level. The output voltage from the operational amplifier U1 is then applied to the base of the first transistor Q1 constituting the output terminal circuit 13 via the base driver 12, thereby causing the transistor Q1 to turn on. In the turn-on state of the transistor Q1, current of "$+i_a$" flows through the resistor $R_c$ of the sensing unit 30, so that a plus voltage is generated across the resistor $R_c$. In other words, the potential at one end of the resistor $R_c$ connected to the load 40 is lower than the potential at the other end of the resistor $R_c$ connected to the first transistor Q1.

Accordingly, the comparing circuit 21, which receives voltages respectively generated at both ends of the sensing unit 30, namely, the resistor $R_c$, outputs a low-level voltage. Since the output voltage from the comparing circuit 21 has a low level, the fourth transistor Q4 of the gate driver 22 turns off whereas the fifth transistor Q5 of the gate driver 22 turns on. In the turn-on state of the fifth transistor Q5, the MOS transistor $Q_t$ of the output terminal circuit 23 turns on. That is, the gate driver 22 outputs a low-level voltage, thereby causing the output terminal circuit 23 to output a high-level voltage.

As the MOS transistor $Q_t$ turns on, the external supply voltage Vdd, namely, high-level voltage, is converted into the form of current by the inductor L1 of the regulation circuit 24. As a result, a current $i_d$ is generated. Consequently, the current $i_o$ flowing through the load 40 corresponds to the sum of the current $i_d$ and the current $i_a$. The final output voltage corresponding to the current flowing through the load is continuously sensed by the negative feedback circuit 14. In other words, the final output voltage is divided by the resistors R2 and R3 of the negative feedback circuit 14 and then applied to the (−) input terminal of the operational amplifier U1. When the voltage applied to the (−) input terminal of the operational amplifier U1 is lower than the reference voltage $V_{ref}$ applied to the (+) input terminal of the operational amplifier U1, the current $+i_a$ and the current $i_d$ are continuously supplied to the load resistor.

When the current $i_d$ is greater than the current $i_o$, the surplus portion of the current $i_d$ flows reversely through the resistor $R_c$. That is, current $−i_a$ is generated. This current is absorbed in the ground in accordance with the operation of the transistor $Q_a$ included in the output terminal circuit 13. At this time, minus voltage is generated across the sensing resistor $R_c$ of the sensing unit 30. As a result, the level of the input voltage at the comparing circuit 21 is inverted.

Accordingly, the output stage circuit 23 of the switching regulator 20 turns off, so that the current $i_d$ flowing through the inductor L1 decreases in amount. The decrease in the current $i_d$ results in a rapid increase in the current $i_a$, thereby rapidly compensating for the decreased portion of the current $i_d$. When the current $i_a$ increases to a desired amount, a plus voltage is generated again across the sensing resistor $R_c$. As a result, the current $i_d$ increases again.

As the above-mentioned operation is repeated, the current $i_d$ supplied via the inductor L1 has a waveform in which small ripple current is included in large DC current. Also, the current ia supplied to the sensing resistor $R_c$ has a waveform corresponding to the waveform of small ripple current. Basically, this means that the series regulator 10, having a wide bandwidth serves to eliminate ripple components of an output from the switching regulator 20, thereby generating output current $i_o$ having no ripple. In accordance with such a characteristics, a prominent regulation is achieved.

Characteristic values of elements essentially used to configure the hybrid regulator according to the present invention will be described.

The resistance range of the sensing resistor $R_c$ should be appropriately selected. An increase in the resistance of the sensing resistor $R_c$ is advantageous in terms of the switching regulator in that the sensing resistor $R_c$ exhibits an increased sensitivity at an increased resistance thereof. In terms of the series regulator 10, however, the power transmitted from the series regulator 10 to the load 40 decreases undesirably when the resistance of the sensing resistor $R_c$ is excessively high. This is because the sensing resistor $R_c$ is configured to be coupled in series to the load, namely, the resistor R4. Where the resistance of the sensing resistor $R_c$ is excessively low, the output voltage from the sensing resistor $R_c$, namely, a sensing voltage, is influenced by noise voltage. Therefore, the resistance range of the sensing resistor $R_c$ should be appropriately selected. In accordance with the present invention, the sensing resistor $R_c$ preferably has a resistance ranging from 0.01 Ω to 10 Ω.

The inductance range of the inductor L1 should also be appropriately chosen. It is possible to reduce the inductance as the switching frequency used increases. However, when the inductance is excessively small, a large amount of current flows abruptly. In this case, there is a problem in that the MOS transistor $Q_t$ of the output stage circuit 23 may be damaged. On the other hand, where the inductance is excessively large, for example, infinite, the same effect as in the case using no switching regulator is exhibited. Therefore, the inductor L1 preferably has an inductance ranging from 10 μH to 1,000 μH.

In addition, it is possible to regulate the output only with the capacitor C1 of the regulation circuit 23 having a capacitance ranging from several ten nF to several hundred nF.

This is because the hybrid regulator of the present invention is configured by combining the series regulator 10, which has a superior regulation performance and serves as an independent voltage source, with the switching regulator 20 serving as a dependent current source.

Now, results of an experiment carried out for the hybrid regulator of the present invention will be described in conjunction with FIGS. 4a to 4d.

In the experiment, +12V DC was used as an external supply voltage whereas +5V DC, which is easily available, was set as an output voltage to be obtained. For a light load, a load of 75 Ω was coupled to the hybrid regulator. For a heavy load, a load of 5 Ω is additionally connected in parallel to the load of 75 Ω. A variation in load was intentionally made, in order to observe a variation in output voltage and the amounts of current respectively supplied from the series regulator 10 and switching regulator 20 depending on the variation in load.

The 5 Ω load was connected in parallel to the 75 Ω load while a switch was arranged between the two loads. The variation in load was made by alternatively switching on and off the switch.

Figure 4A:
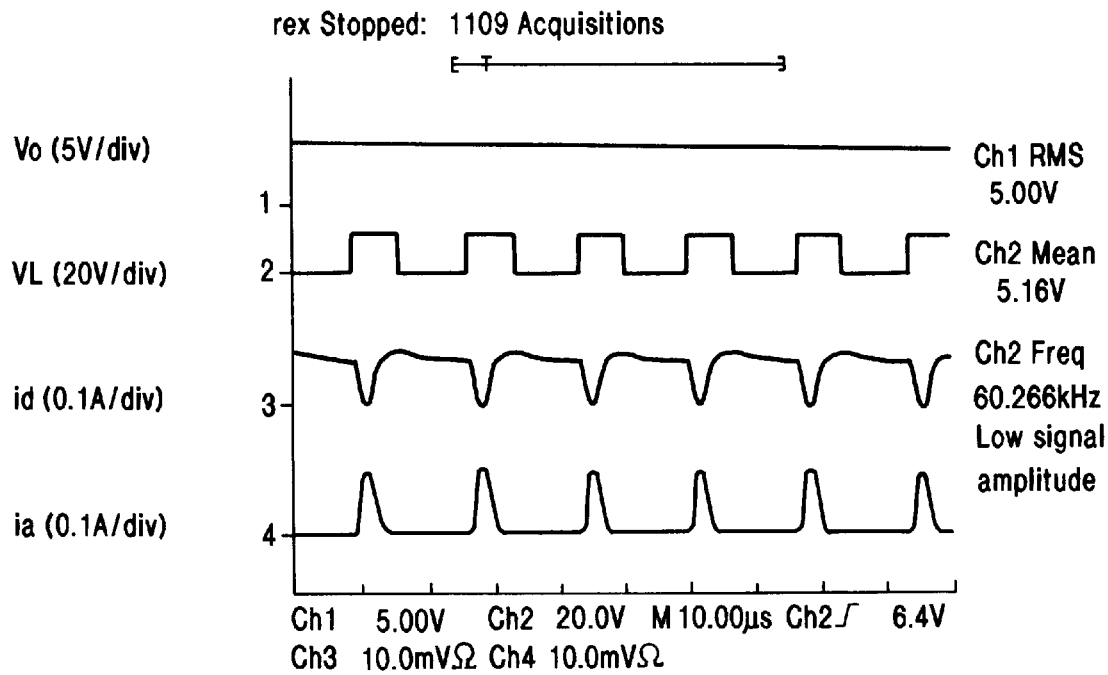
FIGS. 4a to 4d are waveform diagrams of outputs generated in the hybrid regulator according to the present invention, respectively.
Figure 4B:
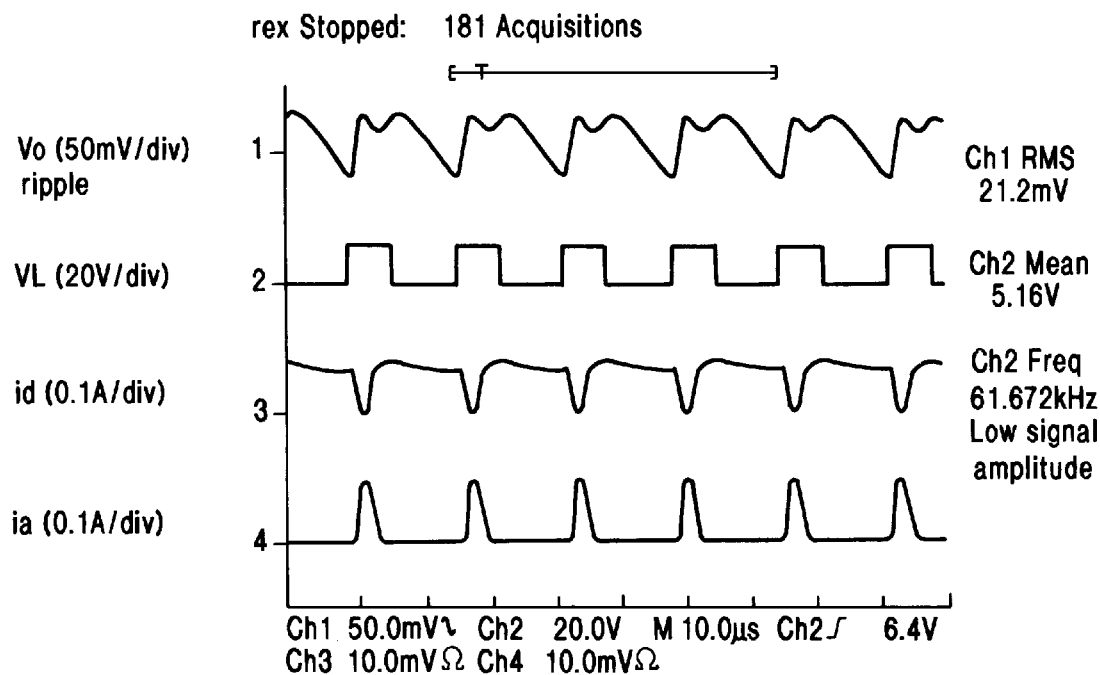
Figure 4C:
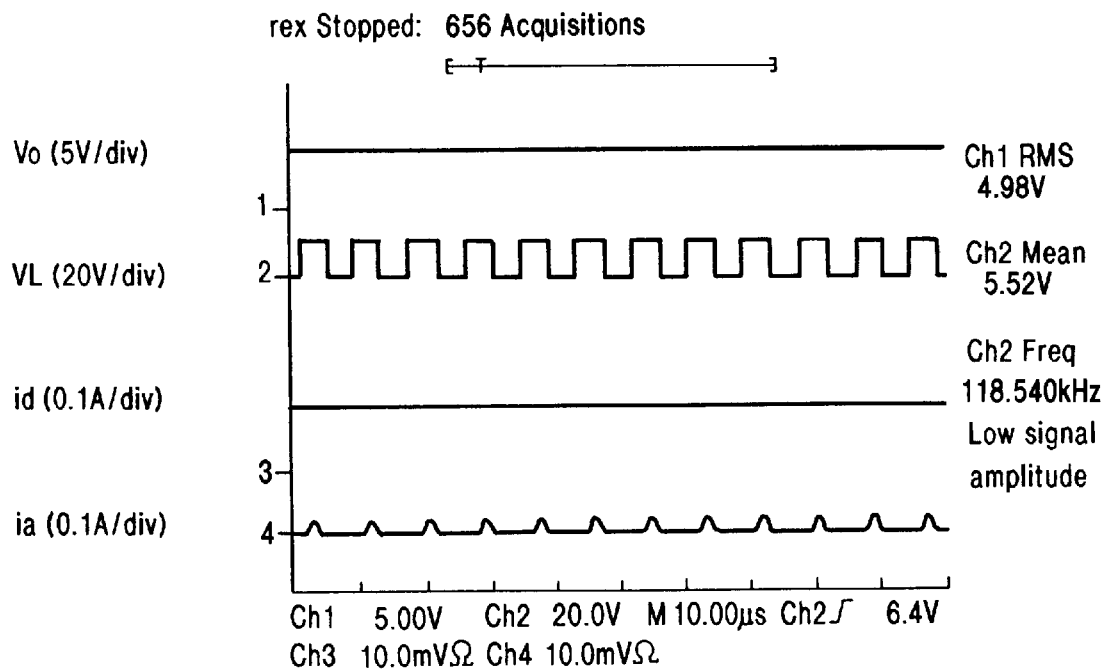
Figure 4D:
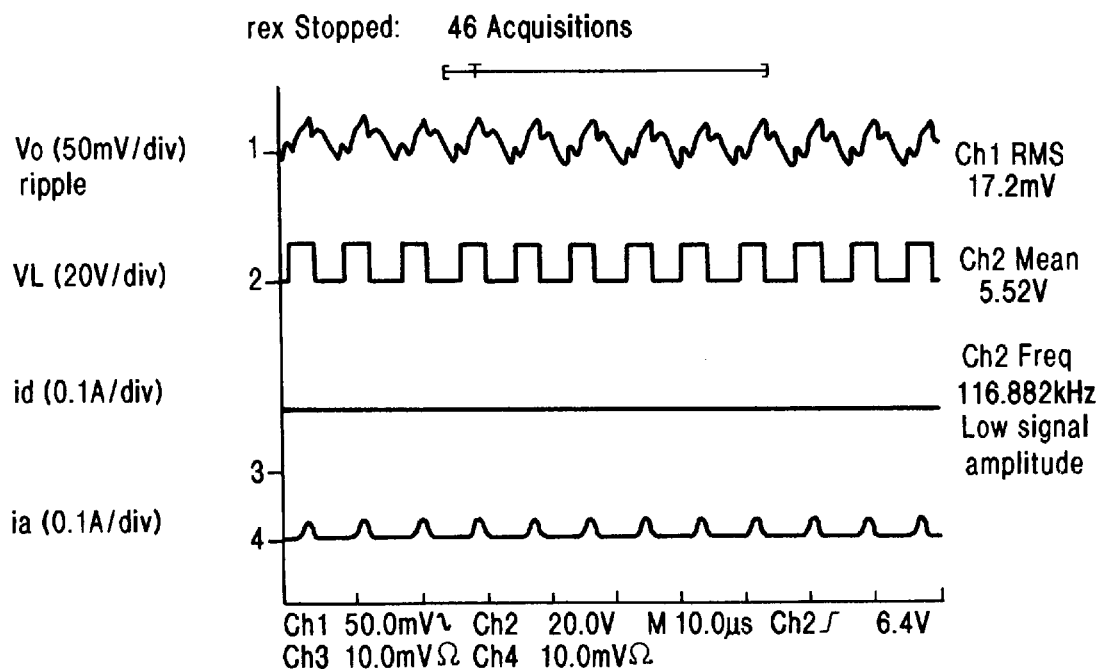

The physical quantities shown in FIGS. 4a to 4d include an output voltage Vo from the hybrid regulator, a voltage $V_L$ applied to the inductor L1, a current $i_d$ supplied from the switching regulator 20, and a current $i_a$ supplied from the series regulator 10. FIGS. 4a and 4b illustrate waveforms of outputs generated in a light load state, namely, a state in which the load resistor R4 has a resistance of 75 Ω. On the other hand, FIGS. 4c and 4d illustrate waveforms of outputs observed in a heavy load state, namely, a state in which the load resistor R4 has a resistance of 75 Ω in parallel with 5 Ω. In each of FIGS. 4b and 4d, the uppermost waveform is an enlarged waveform of only the ripple component of the output voltage.

Referring to FIGS. 4a to 4d, it can be found that a well-regulated output is shown. Referring to FIGS. 4b and 4d, it can be found that a ripple of about 30 mVp (corresponding to 0.6% based on the percentage of the output) exists in the output in the light load state whereas a ripple of about 20 mVp (corresponding to 0.4%) exists in the output in the heavy load state.

Referring to FIG. 4a (in the light load state), it can be found that most of the current flowing through the load is supplied from the switching regulator whereas the series regulator supplies only the ripple current. Referring to FIG. 4c (in the heavy load state), it can be found that most of the current (about 1 A) flowing through the load is supplied from the switching regulator.

Figure 5A:
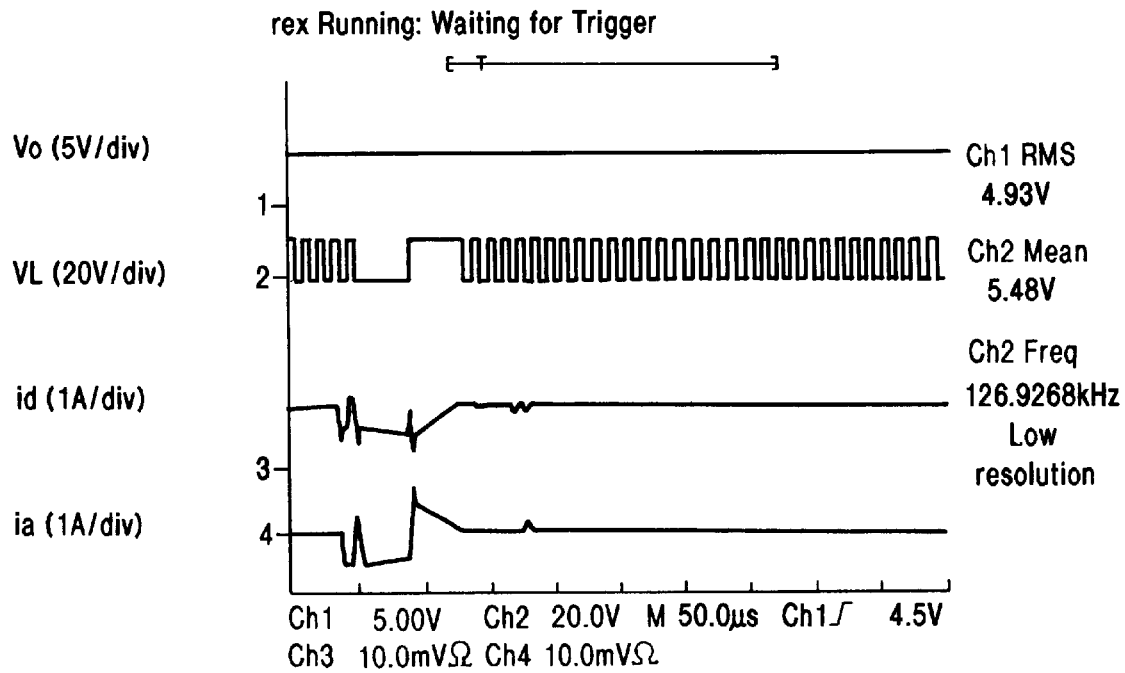
FIGS. 5a and 5b are waveform diagrams illustrating results obtained after measuring an output regulation performance against a variation in load in the hybrid regulator in accordance with the present invention.
Figure 5B:
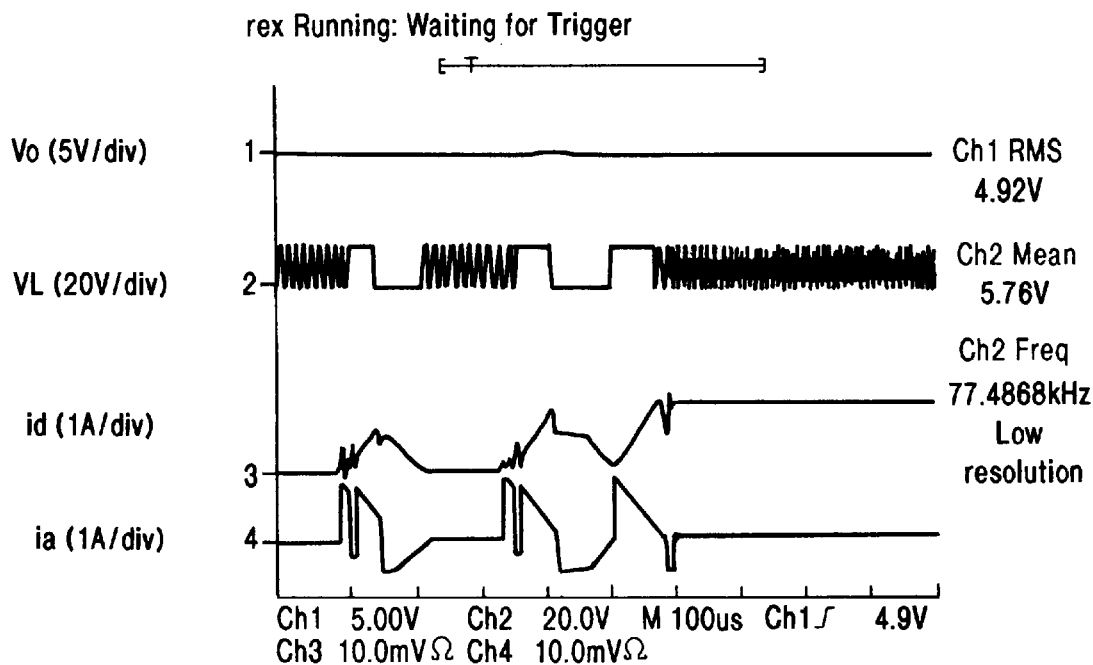

FIGS. 5a and 5b illustrate results obtained after measuring a ripple voltage involved in an output voltage and the amounts of current respectively supplied from the regulators when a variation in load occurs, in a normal mode of an oscilloscope.

Referring to FIGS. 5a and 5b, it can be found that the output voltage involves little ripple in spite of a variation in load. It can also be found that the series regulator 10 rapidly supplies an insufficient portion of the current $i_d$ insufficiently supplied from the switching regulator 20 while rapidly absorbing an excessive portion of the current $i_d$ excessively supplied from the switching regulator 20.

Another experiment was carried out to measure the power efficiency of the hybrid regulator according to the present invention. In this experiment, the amount of current externally supplied and the amount of current flowing through a load were measured under the condition using an external supply voltage of +12V, an output voltage of +5V and parallel-connected loads of 75 Ω and 5 Ω. As a result, the externally supplied current was about 0.65 A, and the current flowing through the load was about 1.1 A. When these values are applied to Equation (3), a power transformation efficiency of about 70% is obtained. This efficiency of the hybrid regulator according to the present invention is approximately equivalent to those of conventional switching regulators.

As apparent from the above-mentioned experimental results, the hybrid regulator of the present invention has a superior regulation performance, which is the advantage of conventional series regulators, involving no ripple even when a variation in load occurs, and high efficiency, which is the advantage of conventional switching regulators.

Other or similar technical concepts associated with the present invention are disclosed in more detail in Korean Patent Application No. 97-5529 previously filed in the name of the inventors and associated with amplifiers. Therefore, the present invention can be easily implemented by those skilled in the technical field to which the present invention pertains.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A hybrid regulator comprising:
   a series regulator serving as an independent voltage source; and
   a switching regulator serving as a dependent current source, the switching regulator is coupled to the series regulator in such a manner that the series regulator supplies or absorbs a desired small amount of current to prevent a ripple from being generated when the switching regulator supplies a large amount of current at a high efficiency.

2. The hybrid regulator in accordance with claim 1, further comprising:
   sensing means for sensing the small amount of current supplied or absorbed by the series regulator, thereby generating a sensing voltage adapted to control the switching regulator to supply a large amount of current.

3. The hybrid regulator in accordance with claim 2, wherein the sensing means comprises a sensing resistor coupled between an output terminal of the series regulator and a load.

4. The hybrid regulator in accordance with claim 3, wherein the sensing resistor has a resistance ranging from 0.01 Ω to 10 Ω.

5. The hybrid regulator in accordance with claim 2, wherein the series regulator comprises:

an output stage circuit for supplying an external supply voltage to the sensing means or conducting an output voltage from the sensing means to the ground;

negative feedback means for receiving a voltage applied to a load, dividing the received voltage, and outputting the resultant voltage to determine a gain of the entire system;

a reference voltage generating circuit for dividing the external supply voltage, thereby generating a reference voltage;

an operational amplifier for receiving an output voltage from the reference voltage generating circuit and an output voltage from the negative feedback means; and a base driver for receiving an output voltage from the operational amplifier, thereby controlling the output terminal circuit.

6. The hybrid regulator in accordance with claim 5, wherein:
   the output terminal circuits comprises a P-type transistor and an N-type transistor;
   the P-type transistor has a base adapted to receive an output voltage from the base driver, a collector adapted to receive the external supply voltage, and an emitter to which the sensing means is coupled; and
   the N-type transistor has a base adapted to receive the output voltage from the base driver, a collector coupled to the ground, and an emitter to which the sensing means is coupled.

7. The hybrid regulator in accordance with claim 2, wherein the switching regulator comprises:
   comparing means including a comparator for receiving a voltage applied across the sensing means;
   a gate driver for receiving an output voltage from the comparing means;
   an output stage circuit for receiving an output voltage from the gate driver as a control voltage, thereby supplying of current corresponding to an external supply voltage; and
   a regulation circuit for regulating the current output from the output stage circuit and supplying the regulated current to a load.

8. The hybrid regulator in accordance with claim 7, wherein the regulation circuit comprises an inductor having one end coupled to an output terminal of the output stage circuit and the other end coupled to the load, the inductor also having an inductance ranging from 10 $\mu$H to 1,000 $\mu$H.

* * * * *